US008729762B2

(12) United States Patent
Takahashi et al.

(10) Patent No.: US 8,729,762 B2
(45) Date of Patent: May 20, 2014

(54) PERMANENT MAGNET SYNCHRONOUS MACHINE, AND PRESSING OR EXTRUSION MACHINE INCLUDING PERMANENT MAGNET SYNCHRONOUS MACHINE

(75) Inventors: Akeshi Takahashi, Hitachinaka (JP); Shinichi Wakui, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 473 days.

(21) Appl. No.: 13/032,900

(22) Filed: Feb. 23, 2011

(65) Prior Publication Data

US 2011/0241466 A1 Oct. 6, 2011

(30) Foreign Application Priority Data

Mar. 30, 2010 (JP) .................... 2010-076571

(51) Int. Cl.
H02K 1/27 (2006.01)
(52) U.S. Cl.
USPC ................................ 310/156.45; 310/156.49
(58) Field of Classification Search
USPC ............ 310/156.08, 156.12–156.18, 156.57, 310/156.45, 156.49
See application file for complete search history.

(56) References Cited

U.S. PATENT DOCUMENTS

| | | | | |
|---|---|---|---|---|
| 5,162,685 A | * | 11/1992 | Yamaguchi et al. | 310/156.28 |
| 6,492,755 B1 | * | 12/2002 | Jones | 310/156.12 |
| 6,803,690 B2 | * | 10/2004 | Bosch | 310/156.02 |
| 6,858,960 B1 | * | 2/2005 | Muszynski | 310/156.47 |
| 7,768,172 B2 | | 8/2010 | Takahata et al. | |
| 2005/0264122 A1 | * | 12/2005 | Domeki et al. | 310/156.46 |
| 2007/0170800 A1 | * | 7/2007 | Okubo | 310/156.12 |
| 2008/0018190 A1 | | 1/2008 | Takahata et al. | |
| 2009/0251023 A1 | * | 10/2009 | Nakano et al. | 310/156.38 |
| 2010/0244609 A1 | | 9/2010 | Takahata et al. | |

FOREIGN PATENT DOCUMENTS

| | | | | |
|---|---|---|---|---|
| JP | 63202248 A | * | 8/1988 | H02K 21/08 |
| JP | 01138955 A | * | 5/1989 | H02K 21/08 |
| JP | 01157253 A | * | 6/1989 | H02K 21/08 |
| JP | 09-201028 | | 7/1997 | |
| JP | 10-271727 | | 10/1998 | |
| JP | 2001-191376 | | 7/2001 | |
| JP | 2002084690 | | 3/2002 | |
| JP | 2007028857 A | * | 2/2007 | |
| JP | 2007074898 | | 3/2007 | |
| JP | 2008029095 | | 2/2008 | |
| JP | 2009-106962 | | 5/2009 | |
| JP | 2010035294 | | 2/2010 | |
| JP | 2010110142 | | 5/2010 | |
| JP | 2010154583 | | 7/2010 | |
| JP | 2010161832 | | 7/2010 | |

* cited by examiner

Primary Examiner — Tran Nguyen
(74) Attorney, Agent, or Firm — Antonelli, Terry, Stout & Kraus, LLP.

(57) ABSTRACT

To provide a permanent magnet synchronous machine capable of expanding a high-speed operation range without reducing torque, and a pressing machine or an extrusion machine using the permanent magnet synchronous machine. In order to achieve the object described above, the present invention provides a permanent magnet synchronous electric machine having at least one permanent magnet on a radial surface of a rotor core, the permanent magnet having a rotor constituting a field pole, wherein a plurality of slits constituted by nonmagnetic material is provided on a core part between adjacent permanent magnets with opposite magnetic polarities of the rotor. According to the present invention, expansion of a high-speed operation range can be achieved without reducing torque.

6 Claims, 5 Drawing Sheets

PERMANENT MAGNET SYNCHRONOUS MACHINE, AND PRESSING OR EXTRUSION MACHINE INCLUDING PERMANENT MAGNET SYNCHRONOUS MACHINE

BACKGROUND OF THE INVENTION

The present invention relates to a permanent magnet synchronous machine, and a pressing or extrusion machine using the permanent magnet synchronous machine.

When a permanent magnet synchronous electric machine is rotated at high speed, a voltage drop by inductance increases in proportion to the rotational speed. Therefore, an upper limit of the rotational speed is set in order to prevent a shortage of input voltage. As disclosed in FIG. 4 of JP-A-2002-84690, there is a technique that aims to expand a high-revolving speed range by providing slits in a pole shoe on an outer side and in a pole shoe on an inner side of a permanent magnet embedded in a rotor so as to reduce inductance.

However, with a configuration described in the conventional technique, a radial length of the permanent magnet is greater than a radial length of a rotor core, resulting in an extremely high magnetic resistance. Configurations using such a thick-walled permanent magnet can be found as measures for improving tolerance to demagnetization of a ferrite magnet. In such a configuration, since a major portion of stator flux flows through a pole shoe of a rotor, although slits provided on the pole shoe contribute towards reducing inductance, slits provided on a core part are hardly effective. It is therefore conceivable that, for this reason, JPA-2002-84690 does not clearly specify a quantitative effect. On the other hand, providing slits on the core part reduces flux paths constituted by magnetic material and makes magnetic saturation more likely. Accordingly, there is a problem in that flux generated by the permanent magnet is reduced and, in turn, torque is reduced. While JP-A-2002-84690 avoids any mention of this problem, this is conceivably due to a fact that since a remanent flux density of a permanent magnet is around 0.5 T when using a ferrite magnet, significant magnetic saturation does not occur even when a fair number of slits is provided on the core part.

In contrast, with a rare-earth magnet such as a neodymium magnet, remanent flux density reaches 1 T or higher and magnetic saturation becomes more likely when slits are provided on a rotor. In particular, with a surface permanent magnet synchronous machine, due to a structure thereof, saliency ratio approaches 1 and, in many cases, reluctance torque cannot be sufficiently utilized. Therefore, it is important that torque is generated by a permanent magnet as effectively as possible. For this reason, a method of providing slits on a rotor conceivably causes a decrease in permanent magnet flux and a reduction of torque and is therefore not generally adopted.

BRIEF SUMMARY OF THE INVENTION

As described above, while a method of reducing inductance is effective for expanding a high-revolving speed range of a permanent magnet synchronous electric machine, there is a dilemma in that a use of a rare-earth magnet increases a likelihood of magnetic saturation when slits are provided on a rotor in order to reduce inductance, thereby causing a decrease in flux generated by a permanent magnet as well as a decrease in torque.

An object of the present invention is to provide a permanent magnet synchronous machine capable of expanding a high-speed operation range without reducing torque, and a pressing or extrusion machine using the permanent magnet synchronous machine.

According to the invention, a permanent magnet synchronous motor comprises a rotor including a rotor iron core and at least two permanent magnets arranged circumferentially on the rotor iron core to form respective field poles, wherein the rotor iron core has a plurality of slits including therein non-magnetic substance and extending between the permanent magnets circumferentially juxtaposed to each other and being different from each other in magnetic pole direction.

In the permanent magnet synchronous motor, $Tp<Tc$ is satisfied when each of the slits has one of straight shape and arcuate shape, $Tp$ is a radial thickness of each of the permanent magnets, and $Tc$ is a radial thickness of the rotor iron core.

In the permanent magnet synchronous motor, the permanent magnets are rare-earth magnets.

In the permanent magnet synchronous motor, the slits are radially juxtaposed to each other, and a radial width of one of the slits of relatively radial inside is greater than a radial width of the other one of the slits of relatively radial outside.

In the permanent magnet synchronous motor, a distance between the slits circumferentially juxtaposed to each other at relatively radial inside is smaller than a distance between the slits circumferentially juxtaposed to each other at relatively radial outside.

In the permanent magnet synchronous motor, $0.045<Wsl/Wpm<0.425$ is satisfied when $Wpm$ is an amount of total circumferential width of a surface of the permanent magnet facing to the rotor iron core to form one of the field magnetic poles, and $Wsl$ is a total amount of widths of the slits extending partially between the surface and a center of the rotor to correspond to the one of the field magnetic poles, each of the widths being a dimension of respective one of the slits in a direction perpendicular to a longitudinal direction of the respective one of the slits.

According to the present invention, a pressing machine comprises an electric motor, an electric power source, an electric motor controller, and a slide drive mechanism through which a rotational movement of the electric motor is converted into a reciprocal movement of a slide, wherein the electric motor has a rotor including a rotor iron core and at least two permanent magnets arranged circumferentially on the rotor iron core to form respective field poles, wherein the rotor iron core has a plurality of slits including therein non-magnetic substance and extending between the permanent magnets circumferentially juxtaposed to each other and being different from each other in magnetic pole direction.

In the pressing machine, a length of each of the slits in its longitudinal direction is greater than a maximum circumferential dimension of each of the permanent magnets.

In the pressing machine, the permanent magnets are rare-earth magnets.

In the pressing machine, the slits are radially juxtaposed to each other, and a radial width of one of the slits of relatively radial inside is greater than a radial width of the other one of the slits of relatively radial outside.

In the pressing machine, a distance between the slits circumferentially juxtaposed to each other at relatively radial inside is smaller than a distance between the slits circumferentially juxtaposed to each other at relatively radial outside.

In the pressing machine, $0.045<Wsl/Wpm<0.425$ is satisfied when $Wpm$ is an amount of total circumferential width of a surface of the permanent magnet facing to the rotor iron core to form one of the field magnetic poles, and $Wsl$ is a total amount of widths of the slits extending partially between the surface and a center of the rotor to correspond to the one of the field magnetic poles, each of the widths being a dimension of respective one of the slits in a direction perpendicular to a longitudinal direction of the respective one of the slits.

According to the present invention, an extrusion machine comprises an electric motor, an electric power source, an electric motor controller, and a slide drive mechanism through which a rotational movement of the electric motor is converted into a reciprocal movement of a slide, wherein the electric motor has a rotor including a rotor iron core and at least two permanent magnets arranged circumferentially on the rotor iron core to form respective field poles, wherein the rotor iron core has a plurality of slits including therein non-magnetic substance and extending between the permanent magnets circumferentially juxtaposed to each other and being different from each other in magnetic pole direction.

In the extrusion machine, a length of each of the slits in its longitudinal direction is greater than a maximum circumferential dimension of each of the permanent magnets.

In the extrusion machine, the permanent magnets are rare-earth magnets.

In the extrusion machine, the slits are radially juxtaposed to each other, and a radial width of one of the slits of relatively radial inside is greater than a radial width of the other one of the slits of relatively radial outside.

In the extrusion machine, a distance between the slits circumferentially juxtaposed to each other at relatively radial inside is smaller than a distance between the slits circumferentially juxtaposed to each other at relatively radial outside.

In the extrusion machine, $0.045 < Wsl/Wpm < 0.425$ is satisfied when Wpm is an amount of total circumferential width of a surface of the permanent magnet facing to the rotor iron core to form one of the field magnetic poles, and Wsl is a total amount of widths of the slits extending partially between the surface and a center of the rotor to correspond to the one of the field magnetic poles, each of the widths being a dimension of respective one of the slits in a direction perpendicular to a longitudinal direction of the respective one of the slits.

A permanent magnet synchronous machine according to the present invention, and a pressing machine or an extrusion machine using the permanent magnet synchronous machine, are capable of expanding a high-speed operation range without reducing torque.

Other objects, features and advantages of the invention will become apparent from the following description of the embodiments of the invention taken in conjunction with the accompanying drawings.

DETAILED DESCRIPTION OF THE INVENTION

Hereinafter, embodiments of the present invention will be described with reference to the drawings.

First Embodiment

Figure 1:
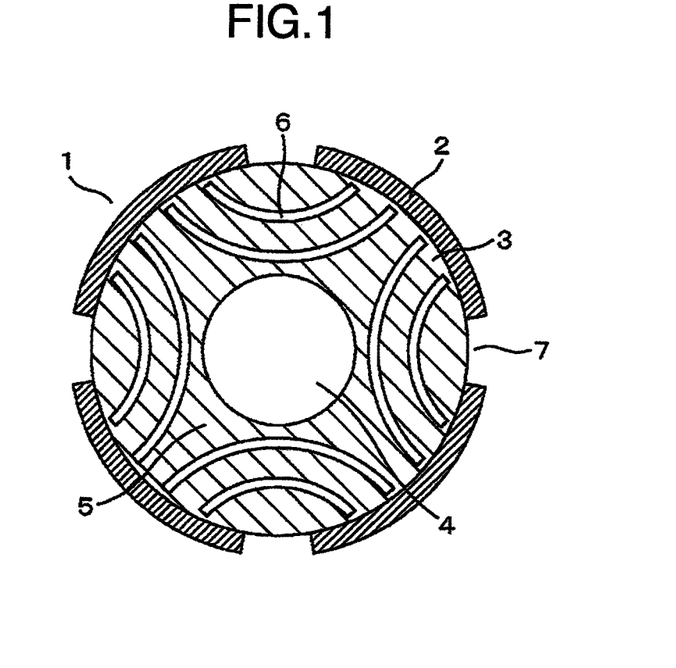
FIG. 1 is a radial cross-sectional view of a rotor of a permanent magnet synchronous electric machine according to a first embodiment of the present invention.
Figure 2:
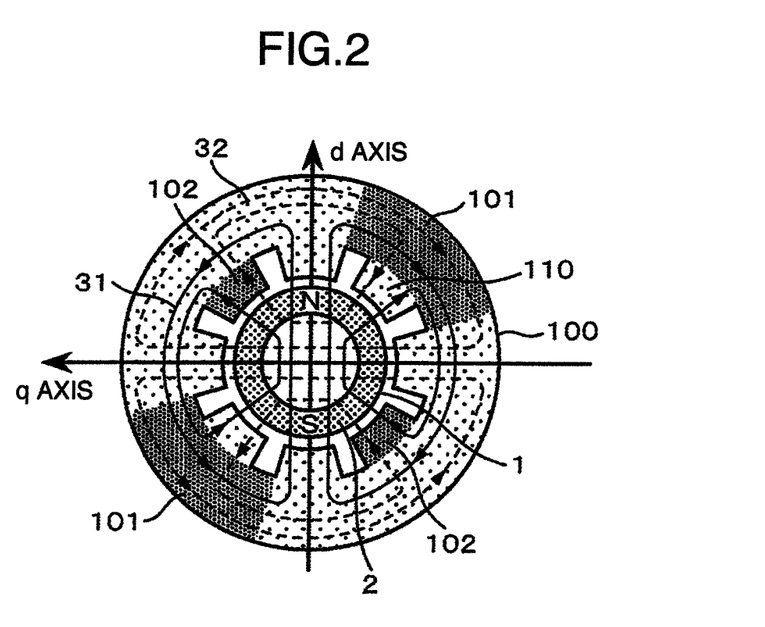
FIG. 2 is a schematic diagram of magnetic flux lines on a radial cross section of a permanent magnet synchronous electric machine according to the first embodiment of the present invention.
Figure 4:
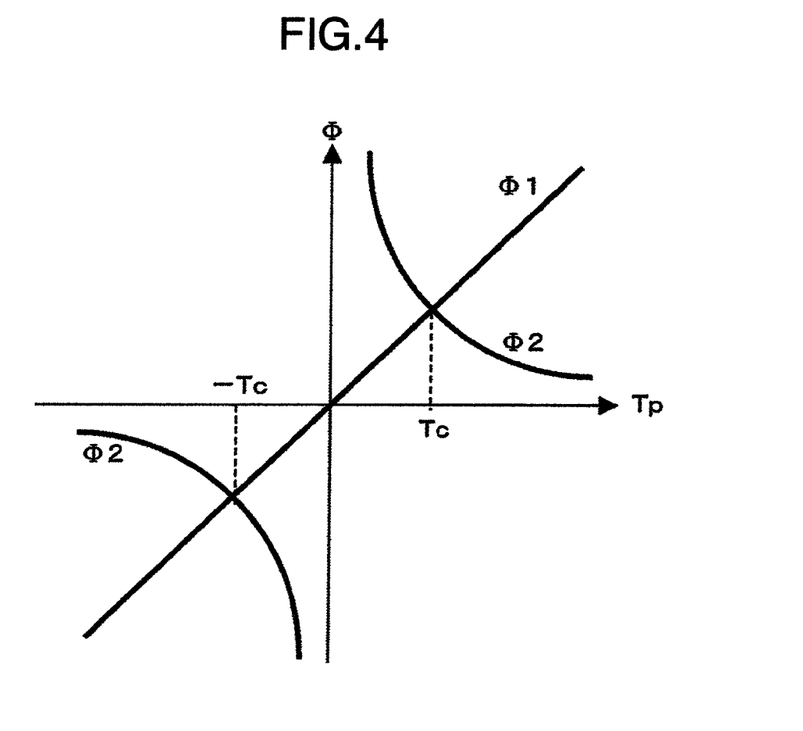
FIG. 4 is an explanatory diagram of advantages of the present invention.
Figure 5:
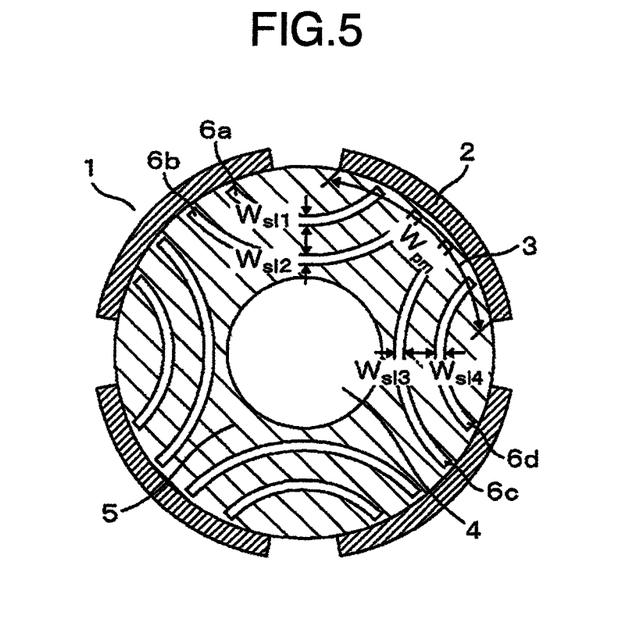
FIG. 5 is a radial cross-sectional view of a rotor for describing a width of a permanent magnet and a width of a slit provided on a rotor core illustrated in FIG. 1.

FIG. 1 is a radial cross-sectional view of a rotor of a permanent magnet synchronous electric machine according to a first embodiment of the present invention. In addition, FIG. 2 is a schematic diagram of magnetic flux lines on a radial cross section of a permanent magnet synchronous electric machine according to the first embodiment of the present invention, FIG. 5 is a radial cross-sectional view of a rotor for describing a width of a permanent magnet and a width of a slit provided on a rotor core illustrated in FIG. 1, and FIG. 4 illustrates a relationship diagram of a slit width, no-load back EMF E0, torque Mp, and quadrature axis inductance Lq according to the present embodiment.

In FIG. 1, a rotor 1 is constituted by lamination steel and transfers power to outside via an output shaft inserted into a shaft hole 4. Permanent magnets 2 are arranged on a radial surface of a rotor core 5 so as to form a quadrupole. A reduction in inductance can be achieved by providing slits 6 constituted by nonmagnetic material on the rotor core 5.

The slits 6 may be configured as continuous arcs connecting magnetic poles as illustrated in FIG. 1, or as a series of round or square holes. In addition, a configuration where a resin such as epoxy is embedded in the slits 6 may be adopted. In this case, strength can be enhanced without affecting magnetic characteristics.

A radial cross-sectional shape of the rotor core 5 may be circular as illustrated in FIG. 1 or may have a polygonal shape that corresponds to a pole number. In addition, a protruding part may be provided on an outer circumferential part of the rotor core 5 so as to fill a gap 7 between magnetic poles of the permanent magnet. Furthermore, a depressed part may be provided on the outer circumferential part of the rotor core 5 by further digging the gap 7 between the magnetic poles. When the protruding part is provided, while an anchorage strength of the permanent magnet with respect to circumferential stress is increased and reluctance torque becomes usable, since inductance increases, it is difficult to expand a high-speed operation range without reducing torque. On the other hand, when the depressed part is provided, since inductance decreases, a high-speed operation range can be expanded without reducing torque.

Moreover, the permanent magnet 2 is a sintered magnet whose primary component is rare earth, and while one pole is constituted by one permanent magnet in FIG. 1, a permanent magnet divided into a plurality of pieces may be axially or circumferentially disposed. In addition, besides a sintered magnet, the permanent magnet 2 can also be formed by a bond magnet. Furthermore, while the permanent magnet 2 illustrated in FIG. 1 has an arc-like radial cross section, a rectangular cross section may be adopted. Alternatively, a D-shaped cross section that is thicker at a center part of a magnetic pole may be adopted.

In addition, the rotor configured as described above may be structured as an outer-side rotation rotor. In this case, a radial cross-sectional shape of the rotor core 5 becomes a toric shape and the permanent magnets 2 are to be arranged on an inner circumferential surface of the rotor core 5.

With conventional techniques regarding a permanent magnet synchronous electric machine using a rare-earth magnet, it is thought that while inductance can be reduced by providing slits, a reduction in flux paths causes a decrease in flux generated by the permanent magnet and, as a result, torque also decreases. In contrast, the present invention describes that inductance can be reduced without causing a decrease in torque by providing the slits 6. An argument thereof will now be given with reference to FIG. 2.

FIG. 2 is a schematic diagram of magnetic flux lines on a radial cross section of a permanent magnet synchronous electric machine according to the first embodiment of the present invention. A stator 100 includes a toothed part 110, as well as a rotor 1 constituted by a permanent magnet 2 via a gap on an inner circumferential side. As indicated by a solid line, a flux 31 generated by the permanent magnet 2 becomes parallel to a direct axis when penetrating a rotor and follows an arc-like trajectory when penetrating a stator core. As indicated by a dotted line, an stator flux 32 becomes parallel to a quadrature axis when penetrating a rotor and follows an arc-like trajectory when penetrating a stator core. When driving the permanent magnet synchronous electric machine, since the permanent magnet flux 31 and the stator flux 32 overlap each other at a stator core part 101 and a toothed part 102, magnetic saturation at these parts become significant. Therefore, a problem arises in that due to an increase in stator current, torque (magnet torque) that is normally proportional to current becomes difficult to increase. An effective method to solve this problem is to alleviate magnetic saturation at the stator core part 101 and the toothed part 102 by reducing quadrature axis inductance and reducing the stator flux 32.

In other words, the present invention focuses on a fact that, by providing slits 6 such as those illustrated in FIG. 1, while a conventionally-conceived disadvantage (a decrease in permanent magnet flux) is created, an advantage (alleviation of magnetic saturation) is achieved which outweighs the disadvantage.

Moreover, with a permanent magnet synchronous electric machine using a ferrite magnet, since remanent flux density of the permanent magnet is around 0.5 T as described earlier, magnetic saturation is unlikely to occur even if the permanent magnet flux 31 and the stator flux 32 overlap each other. Therefore, providing the slits 6 only leads to a decrease in permanent magnet flux and, in turn, a decrease in torque. However, when achieving an improvement in power density by downsizing or the like, an increase in flux density in a machine cannot be avoided even with a permanent magnet synchronous electric machine using a ferrite magnet, and it is highly likely that magnetic saturation is to become significant. The present invention is effective in such cases.

In order to achieve the advantages described above, a thickness Tp of the permanent magnet 2 and a radial thickness Tc of the rotor core 3 are desirably configured so as to satisfy Tp<Tc. An argument thereof will now be given with reference to FIG. 3.

Figure 3:
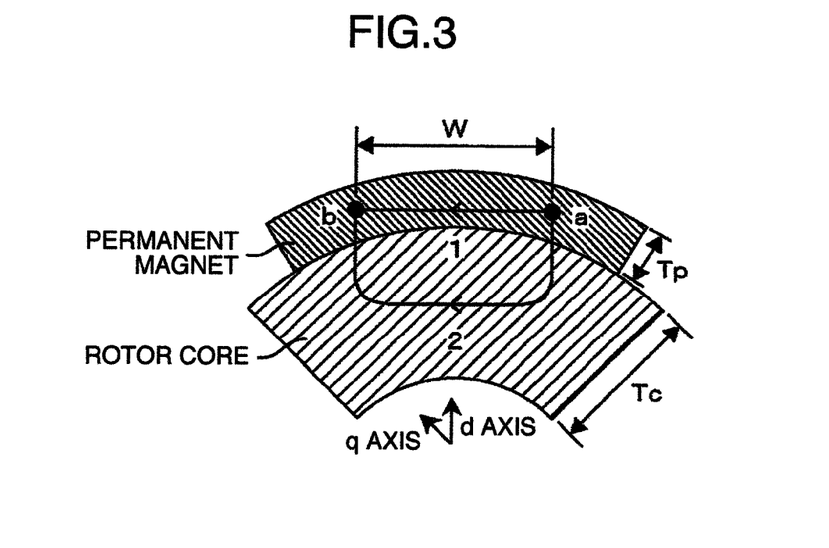
FIG. 3 is an explanatory diagram of advantages of the present invention.

Penetration of stator flux per magnetic pole in a quadrupole machine such as that illustrated in FIG. 3 will now be considered. In this case, FIG. 3 illustrates a configuration that is approximately the same as the rotor illustrated in FIG. 1, an only difference being that no slits are provided on a rotor core. A direction of penetration of flux generated by a permanent magnet is generally referred to as a direct axis, and an axis at a leading position of a 90-degree electric angle (in a quadrupole machine, a 45-degree mechanical angle) with respect to the direct axis is referred to as a quadrature axis.

For the sake of simplicity, a case where an stator flux penetrates from point a to point b in the drawing will be considered. While the stator flux penetrates to point b via routes 1 and 2, a description will be given below on a fact that the greater the thickness Tp of the permanent magnet with respect to the radial thickness Tc of the rotor core, less flux penetrates through the route 2.

First, a magnetic resistance R1 of the route 1 can be expressed by formula (1).

$$R1 = \frac{W}{\mu_0 \cdot T_p \cdot l_{Fe}} \quad \text{[Expression 1]}$$

where $\mu_{Fe}$ denotes relative permeability of iron, $\mu_0$ denotes space permeability, and $l_{Fe}$ denotes axial length of rotor core.

Similarly, a magnetic resistance R2 of the route 2 can be expressed by formula (2). However, with the route 2, for the sake of simplicity, a route length of a permanent magnet part is to be denoted by Tp and a route length of a rotor core part is to be expressed as Tc+W. In addition, a relative permeability of the permanent magnet is assumed to be 1.

$$R2 = \frac{T_p}{\mu_0 \cdot W \cdot l_{Fe}} + \frac{T_c}{\mu_{Fe} \cdot \mu_0 \cdot W \cdot l_{Fe}} + \frac{W}{\mu_{Fe} \cdot \mu_0 \cdot T_c \cdot l_{Fe}} \quad \text{[Expression 2]}$$

If $\Delta F$ denotes an EMF drop from point a to point b, then a flux $\Phi 1$ penetrating the route 1 and a flux $\Phi 2$ penetrating the route 2 can respectively be expressed by formula (3) and formula (4).

$$\Phi 1 \cong \Phi 1(T_p) = \frac{\Delta F}{R1} \quad \text{[Expression 3]}$$
$$= \frac{\mu_0 \cdot T_p \cdot l_{Fe}}{W} \cdot \Delta F$$

$$\Phi 2 \cong \Phi 2(T_p) = \frac{\Delta F}{R2} \quad \text{[Expression 4]}$$
$$= \frac{1}{\frac{T_p}{\mu_0 \cdot W \cdot l_{Fe}} + \frac{T_c}{\mu_{Fe} \cdot \mu_0 \cdot W \cdot l_{Fe}} + \frac{W}{\mu_{Fe} \cdot \mu_0 \cdot T_c \cdot l_{Fe}}} \cdot \Delta F$$
$$= \frac{T_c \cdot W}{\frac{T_p \cdot T_c}{\mu_0 \cdot l_{Fe}} + \frac{T_c^2}{\mu_{Fe} \cdot \mu_0 \cdot l_{Fe}} + \frac{W^2}{\mu_{Fe} \cdot \mu_0 \cdot l_{Fe}}} \cdot \Delta F$$

Although $\mu_{Fe}$ decreases as magnetic saturation becomes more significant, $\mu_{Fe}$ remains high at around 400 to 800 even if it is assumed that a core of the route 1 is in a state of magnetic saturation or, in other words, flux density is around 1.6 T. In addition, compared to TpTc, Tc$^2$ and W$^2$ are values in the order of a factor of around 10. Therefore, since second and third items of a denominator can be ignored, formula (5) can be approximated as follows.

$$\Phi 2(T_p) = \frac{\mu_0 \cdot W \cdot I_{Fe}}{T_p} \cdot \Delta F \qquad \text{[Expression 5]}$$

As is apparent from formula (3) and formula (5), Φ1 is proportional to magnet thickness Tp, and Φ2 is inversely proportional to Tp. A value of Tp when a graph expressed by formula (3) and a graph expressed by formula (5) intersect each other can be expressed by formula (6).

$$\Phi 1(T_p) = \Phi 2(T_p) \Leftrightarrow T_p = \pm W \qquad \text{[Expression 6]}$$

Therefore, Φ1 and Φ2 can be illustrated as in FIG. 4, which shows that Φ2 becomes minimal in a range expressed as Tp>Tc. In other words, by adopting a configuration where Tp<Tc, an effect of slits provided on a back yoke can be enhanced.

According to the present invention, in addition to enabling a reduction in inductance without causing a decrease in torque and enabling expansion of a high-revolving speed range, efficiency can be improved by achieving a reduction in iron loss. In addition, since an electric time constant (∝ inductance) becomes smaller due to the reduction in inductance, transient responsiveness can be improved. Furthermore, since electromagnetic excitation force can be reduced, noise and vibration can also be reduced. Moreover, even in a case where stator current increases, since current and torque form an approximately linear relationship, superior controlled responsiveness is achieved and an application to a servo machine or the like can be readily realized. In addition, since a mass of a rotor is reduced, inertia decreases. As a result, rapid acceleration/deceleration can be accommodated more readily, and since a mechanical time constant (∝ inertia) becomes smaller, input of energy upon motor acceleration can be suppressed.

Figure 6:
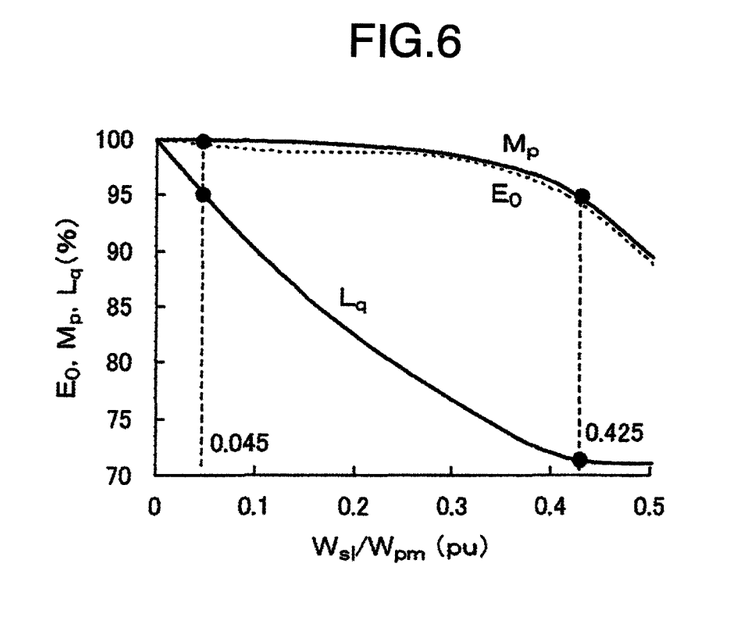
FIG. 6 is a relationship diagram of a slit width, no-load back electromotive force (back EMF), torque, and inductance according to the first embodiment of the present invention.

FIG. 5 and FIG. 6 illustrate a configuration that is capable of achieving advantages of the present invention in a more effective manner. In FIG. 5, like components to FIG. 1 will be denoted by like reference characters and redundant descriptions will be avoided.

The configuration in FIG. 5 differs from FIG. 1 in that four slits 6 provided per magnetic pole are individually defined as 6a, 6b, 6c, and 6d, and that widths of the slits in a direction perpendicular to an extending direction of the slits are respectively defined as $W_{sl1}$, $W_{sl2}$, $W_{sl3}$, and $W_{sl4}$. Another difference is that a circumferential width of an inner circumferential width of a permanent magnet in contact with an outer circumferential surface of the rotor core 5 is defined as $W_{pm}$. If a sum total of widths of the slits 6a to 6d per magnetic pole is expressed as $W_{sl}$, then the following formula (7) is true with respect to the configuration illustrated in FIG. 5.

$$Wsl = Wsl1 + Wsl2 + Wsl3 + Wsl4 \qquad \text{[Expression 7]}$$

In this case, values of $W_{sl1}$ to $W_{sl4}$ may either be the same or may differ from each other. In addition, the number of slits may either be four or less or four or more, and $W_{sl}$ is to denote a sum total of slit widths per magnetic pole.

Furthermore, in FIG. 5, while $W_{pm}$ is consistent with a circumferential width of a single permanent magnet 2, when a single magnetic pole is constituted by a plurality of permanent magnets, $W_{pm}$ is assumed to denote a sum total of circumferential widths of surfaces 3 of the respective permanent magnets.

FIG. 6 illustrates variations in no-load back EMF E0, output torque Mp, and quadrature axis inductance Lq when varying a ratio "$W_{sl}/W_{pm}$" between $W_{sl}$ and $W_{pm}$ described above. However, a case of $W_{sl}/W_{pm}=0$ represents a state where no slits 6 are provided. When 0<$W_{sl}/W_{pm}$, a rate of decrease of output torque Mp is smaller than a rate of decrease of no-load back EMF E0. From this result, it is found that while providing the slits 6 reduces permanent magnet flux, magnetic saturation is alleviated and, consequently, a decrease in torque is compensated. Since output torque Mp and quadrature axis inductance Lq reach knee points at $W_{sl}/W_{pm}=0.425$ and a reduction effect of 5% with respect to quadrature axis inductance Lq can be obtained at $W_{sl}/W_{pm}=0.045$, advantages of the present invention can be effectively achieved by adopting a configuration where 0.045<$W_{sl}/W_{pm}$<0.425.

Figure 7:
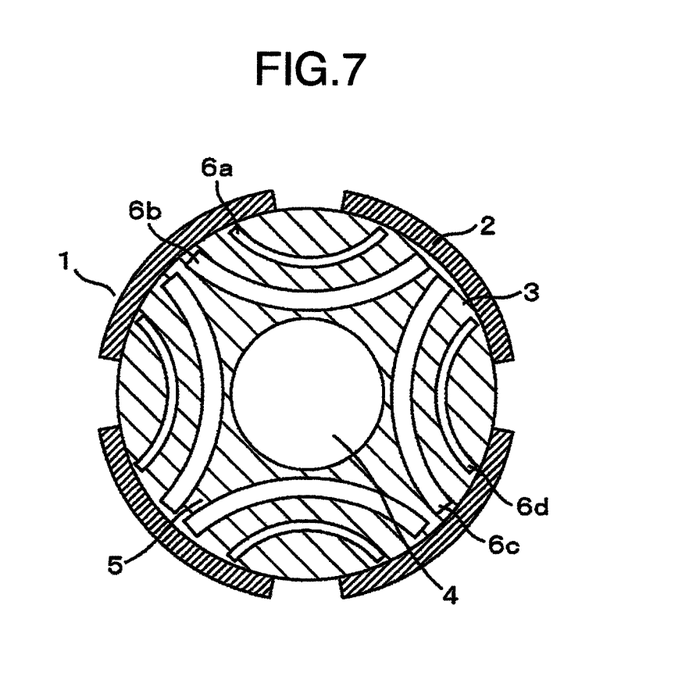
FIG. 7 is a radial cross-sectional view of a rotor of another permanent magnet synchronous electric machine according to the first embodiment of the present invention.

FIG. 7 is a radial cross-sectional view of a rotor of another permanent magnet synchronous electric machine according to the first embodiment of the present invention. In FIG. 7, like components to FIG. 1 will be denoted by like reference characters and redundant descriptions will be avoided.

The configuration illustrated in FIG. 7 differs from FIG. 1 in that, among four slits 6a to 6d provide per pole, widths of slits 6b and 6c that are positioned in a vicinity of a center of a magnetic pole is set wider than widths of slits 6a and 6d positioned in a vicinity of an edge of the magnetic pole. A flux penetrating a vicinity of a center of a magnetic pole splits into two toward both edge parts of the magnetic pole and form a flux path that connects the vicinity of the center of the magnetic pole with a vicinity of a center of a magnetic pole of a permanent magnet which is adjacent and which has an opposite magnetic polarity. Therefore, magnetic saturation of the portion decreases and a decrease in magnetic flux is unlikely to occur even when widths of slits in the vicinity of the center of the magnetic pole are increased as illustrated in FIG. 7. By adopting such a configuration, an inductance reduction effect can be further increased. A similar effect can be obtained by adapting such a configuration in a sextupole machine, an octapole machine, and even in machines with a larger number of poles. Furthermore, as illustrated in FIG. 6, by adopting a configuration where 0.045<$W_{sl}/W_{pm}$<0.425, advantages of the present invention can be effectively achieved.

Figure 8:
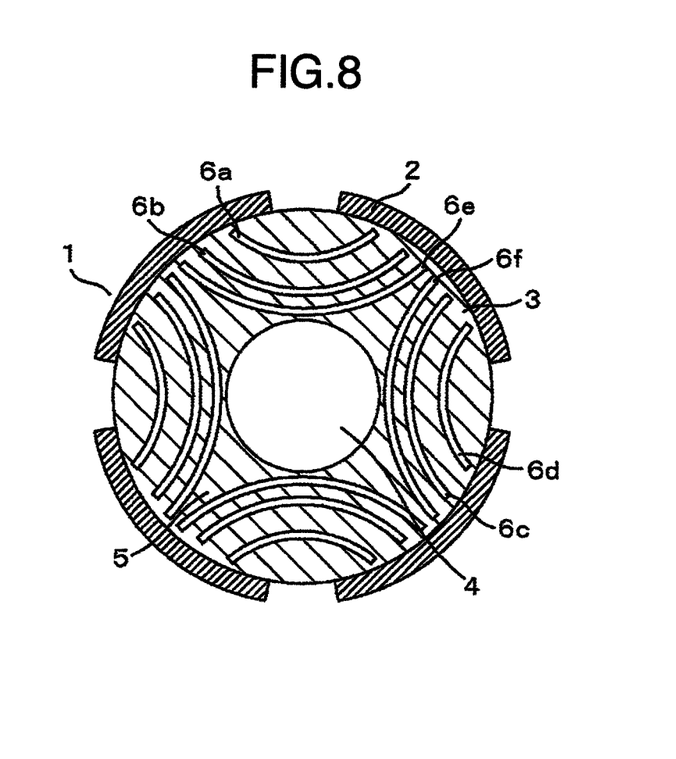
FIG. 8 is a radial cross-sectional view of a rotor of another permanent magnet synchronous electric machine according to the first embodiment of the present invention.

FIG. 8 is a radial cross-sectional view of a rotor of another permanent magnet synchronous electric machine according to the first embodiment of the present invention. In FIG. 8, like components to FIG. 1 will be denoted by like reference characters and redundant descriptions will be avoided.

The configuration illustrated in FIG. 8 differs from FIG. 1 in that six slits are provided per pole, and among slits 6a to 6f, a distance between adjacent slits 6e and 6b or a distance between adjacent slits 6f and 6c positioned in a vicinity of a center of a magnetic pole are set shorter than a distance between adjacent slits 6a and 6b or a distance between adjacent slits 6c and 6d positioned in a vicinity of an edge of the magnetic pole. In the same manner as FIG. 7, by adopting such a configuration, an inductance reduction effect can be further increased. A similar effect can be obtained by adapting such a configuration in a sextupole machine, an octapole machine, and even in machines with a larger number of poles. Furthermore, as illustrated in FIG. 6, by adopting a configuration where 0.045<$W_{sl}/W_{pm}$<0.425, advantages of the present invention can be effectively achieved.

Figure 9:
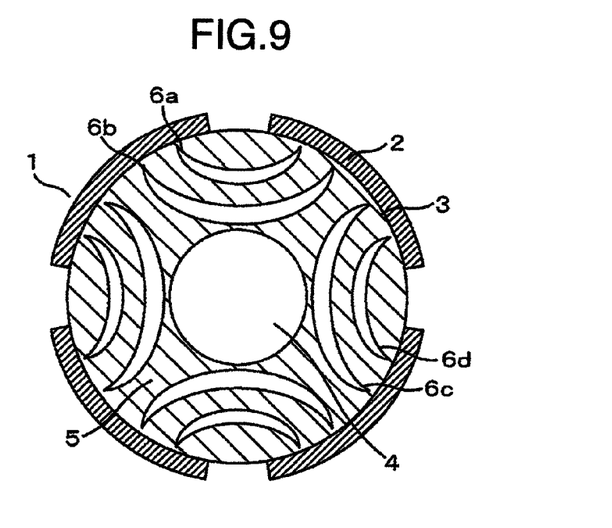
FIG. 9 is a radial cross-sectional view of a rotor of another permanent magnet synchronous electric machine according to the first embodiment of the present invention.

FIG. 9 is a radial cross-sectional view of a rotor of another permanent magnet synchronous electric machine according to the first embodiment of the present invention. In FIG. 9, like components to FIG. 1 will be denoted by like reference characters and redundant descriptions will be avoided.

Figure 10:
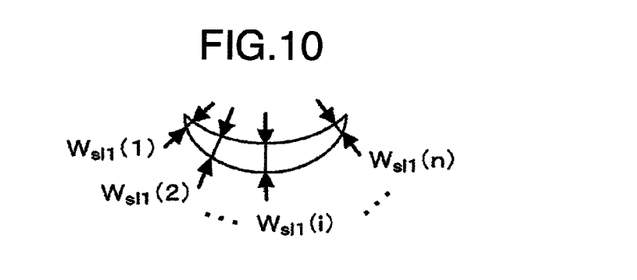
FIG. 10 illustrates a slit shape for describing a width of a slit on a rotor of another permanent magnet synchronous electric machine according to the first embodiment of the present invention.

The configuration illustrated in FIG. 9 differs from FIG. 1 in that each of four slits 6a to 6d provided per pole have an uneven slit width. For example, as illustrated in FIG. 10, since the slit 6a has a large number of different slit widths $W_{sl1}(1)$, $W_{sl1}(2), \ldots, W_{sl1}(n)$, a width $W_{sl1}$ of the slit is defined as an integral average of a direction of the slit extending between magnetic poles divided into minute lengths as expressed by the formula (8) below.

$$Wsl1 = \frac{\sum_{i=1}^{n} Wsl1(i)}{n} \quad \text{[Expression 8]}$$

By defining a width $W_{sl2}$ of the slit 6b, a width $W_{sl3}$ of the slit 6c, and a width $W_{sl4}$ of the slit 6d in a similar manner, a sum total $W_{sl}$ of the widths of the slits 6a to 6d can be expressed in a same manner as formula (7). Even with such a configuration, in addition to enabling a reduction in inductance without causing a decrease in torque and enabling expansion of a high-revolving speed range, efficiency can be improved by achieving a reduction in iron loss. In addition, a similar effect can be obtained with a sextupole machine, an octapole machine, and even with machines with a larger number of poles. Furthermore, as illustrated in FIG. 6, by adopting a configuration where $0.045<W_{sl}/W_{pm}<0.425$, advantages of the present invention can be effectively achieved.

Second Embodiment

Figure 11:
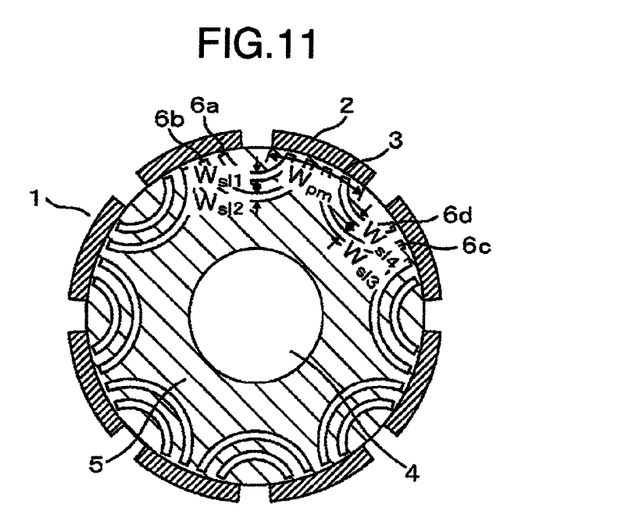
FIG. 11 is a radial cross-sectional view of a rotor of a permanent magnet synchronous electric machine according to a second embodiment of the present invention.

FIG. 11 is a radial cross-sectional view of a rotor of a permanent magnet synchronous electric machine according to a second embodiment of the present invention. In FIG. 11, like components to FIG. 1 will be denoted by like reference characters and redundant descriptions will be avoided.

The configuration in FIG. 11 differs from FIG. 1 in that permanent magnets 2 are arranged so as to form an octapole, four slits 6 provided per magnetic pole are individually defined as 6a, 6b, 6c, and 6d, widths of the slits in a direction perpendicular to an extending direction of the slits are respectively defined as $W_{sl1}$, $W_{sl2}$, $W_{sl3}$, and $W_{sl4}$, and a circumferential width of an inner circumferential surface of a permanent magnet in contact with an outer circumferential surface of a rotor core 5 is defined as $W_{pm}$. A sum total $W_{sl}$ of widths of the slits 6a to 6d can be expressed in a same manner as formula (7).

As described above, even with a sextupole machine, an octapole machine, as well as machines with a larger number of poles, by adopting a configuration such as that illustrated in FIG. 11, the present invention is capable of reducing inductance without causing a decrease in torque, expanding a high-revolving speed range, and improving efficiency by achieving a reduction in iron loss. In addition, since an electric time constant becomes smaller due to the reduction in inductance, transient responsiveness can be improved. Furthermore, since electromagnetic excitation force can be reduced, noise and vibration can also be reduced. Moreover, even in a case where stator current increases, since current and torque form an approximately linear relationship, superior controlled responsiveness is achieved and an application to a servo machine or the like can be readily realized. In addition, since a mass of a rotor is reduced, inertia decreases. As a result, rapid acceleration/deceleration can be accommodated more readily, and since a mechanical time constant becomes smaller, input of energy upon motor acceleration can be suppressed.

Furthermore, as illustrated in FIG. 6, by adopting a configuration where $0.045<W_{sl}/W_{pm}<0.425$, advantages of the present invention can be effectively achieved.

While embodiments of a permanent magnet synchronous electric machine have been described above, as applications of the present invention, the permanent magnet synchronous machine described above can be applied to industrial devices. For example, by applying the permanent magnet synchronous machine described above to a pressing machine (not shown) or an extrusion machine (not shown), expansion of a high-speed operation range can be achieved without reducing torque of such devices.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A permanent magnet synchronous motor, comprising:
a rotor including:
   a rotor iron core, and
   at least two permanent magnets, arranged circumferentially on the rotor iron core to form respective field poles, and different from each other in magnetic pole direction;
wherein the rotor iron core has a plurality of slits including therein non-magnetic substance and extending between the permanent magnets circumferentially juxtaposed to each other;
wherein Tp<Tc is satisfied when each of the slits has one of straight shape and arcuate shape, Tp is a radial thickness of each of the permanent magnets, and Tc is a radial thickness of the rotor iron core; and
wherein 0.045<Wsl/Wpm<0.425 is satisfied when Wpm is an amount of total circumferential width of a surface of the permanent magnet facing to the rotor iron core to form one of the field magnetic poles, and Wsl is a total amount of widths of the slits extending partially between the surface and a center of the rotor to correspond to the one of the field magnetic poles, each of the widths being a dimension of respective one of the slits in a direction perpendicular to a longitudinal direction of the respective one of the slits.

2. The permanent magnet synchronous motor according to claim 1, wherein the permanent magnets are rare-earth magnets.

3. A permanent magnet synchronous motor, comprising:
a rotor including:
   a rotor iron core, and
   at least two permanent magnets, arranged circumferentially on the rotor iron core to form respective field poles, and different from each other in magnetic pole direction;
wherein the rotor iron core has a plurality of slits including therein non-magnetic substance and extending between the permanent magnets circumferentially juxtaposed to each other;
wherein Tp<Tc is satisfied when each of the slits has one of straight shape and arcuate shape, Tp is a radial thickness of each of the permanent magnets, and Tc is a radial thickness of the rotor iron core; and
wherein a distance between the slits circumferentially juxtaposed to each other at relatively radial inside is smaller than a distance between the slits circumferentially juxtaposed to each other at relatively radial outside.

4. The permanent magnet synchronous motor according to claim 3, wherein the permanent magnets are rare-earth magnets.

5. A permanent magnet synchronous motor, comprising:
a rotor including:
   a rotor iron core, and
   at least two permanent magnets, arranged circumferentially on the rotor iron core to form respective field poles, and different from each other in magnetic pole direction;
wherein the rotor iron core has a plurality of slits including therein non-magnetic substance and extending between the permanent magnets circumferentially juxtaposed to each other;
wherein $Tp<Tc$ is satisfied when each of the slits has one of straight shape and arcuate shape, Tp is a radial thickness of each of the permanent magnets, and Tc is a radial thickness of the rotor iron core; and
wherein the slits are radially juxtaposed to each other, and a radial width of one of the slits of relatively radial inside is greater than a radial width of the other one of the slits of relatively radial outside.

6. The permanent magnet synchronous motor according to claim 5, wherein the permanent magnets are rare-earth magnets.

* * * * *